Feb. 22, 1966 W. G. ANDERS ETAL 3,236,577
ARTICLE CARRYING CONVEYOR DRIVEN EQUIPMENT
Filed July 22, 1963 7 Sheets-Sheet 1
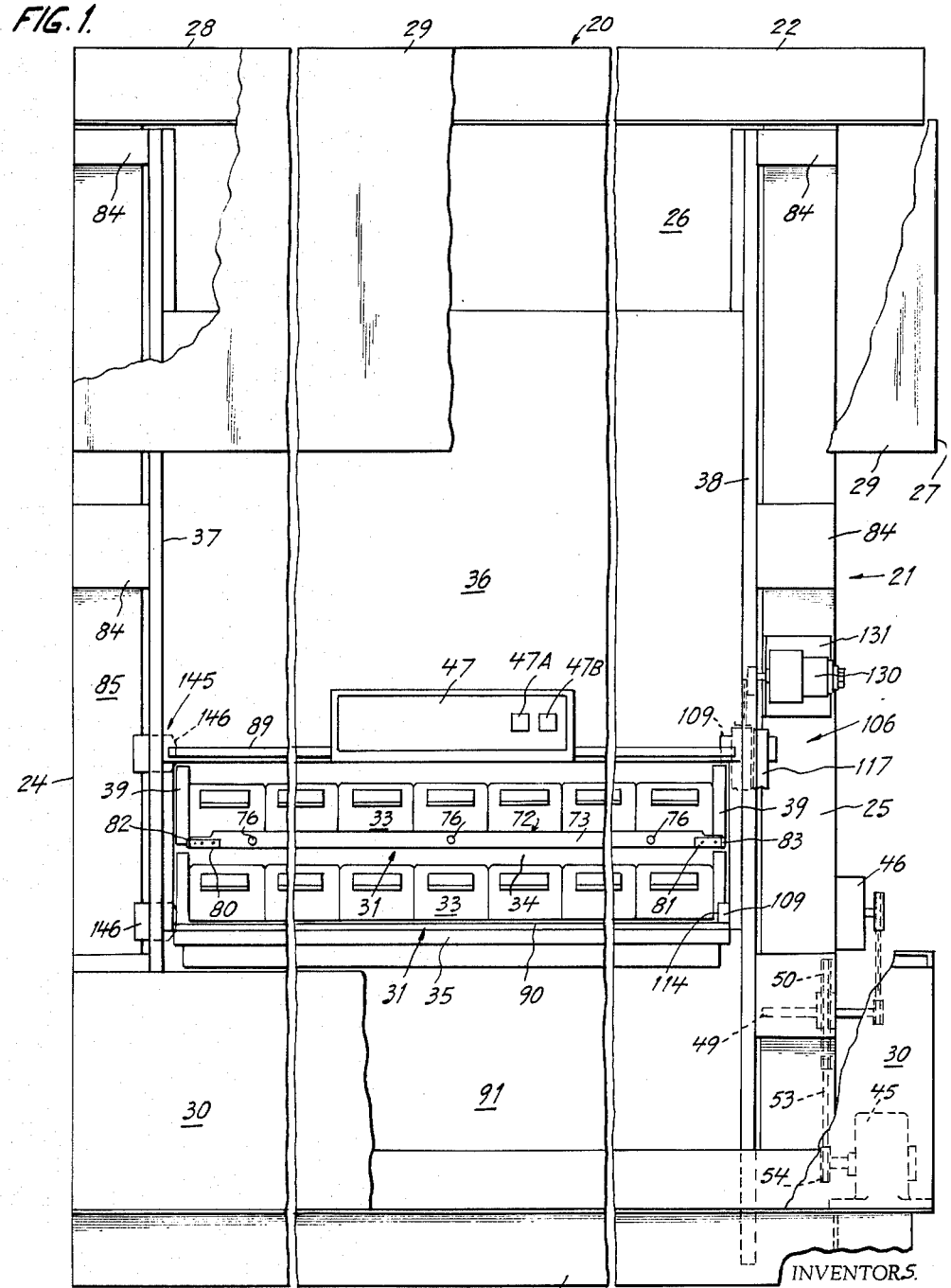
INVENTORS.
WALTER G. ANDERS
BENJAMIN W. WOODWARD
BY
ATTORNEY Feb. 22, 1966 W. G. ANDERS ETAL 3,236,577
ARTICLE CARRYING CONVEYOR DRIVEN EQUIPMENT
Filed July 22, 1963 7 Sheets-Sheet 2

INVENTORS.
WALTER G. ANDERS
BY BENJAMIN W. WOODWARD

ATTORNEY

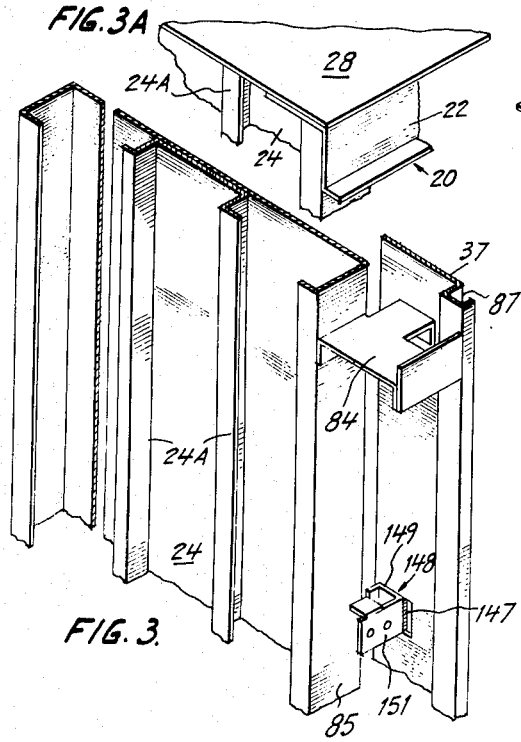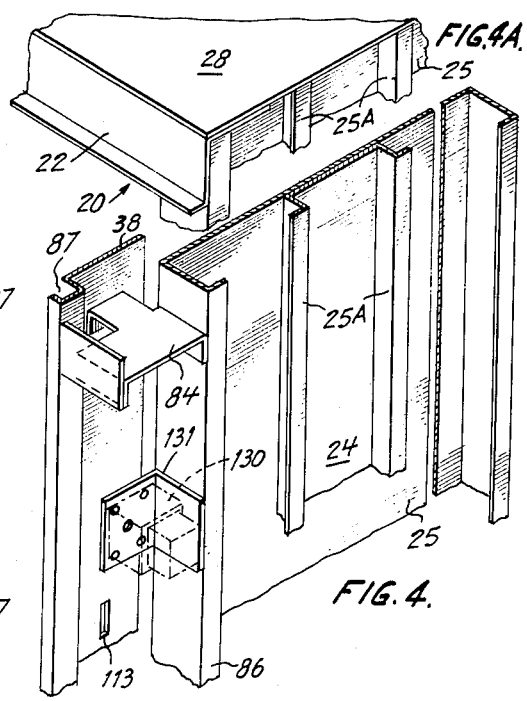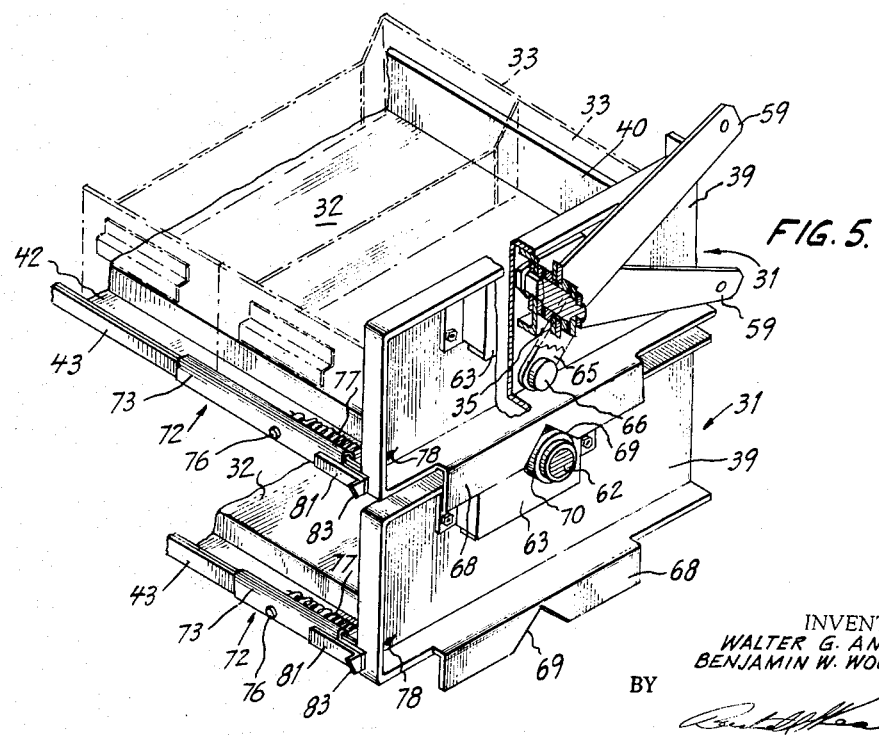

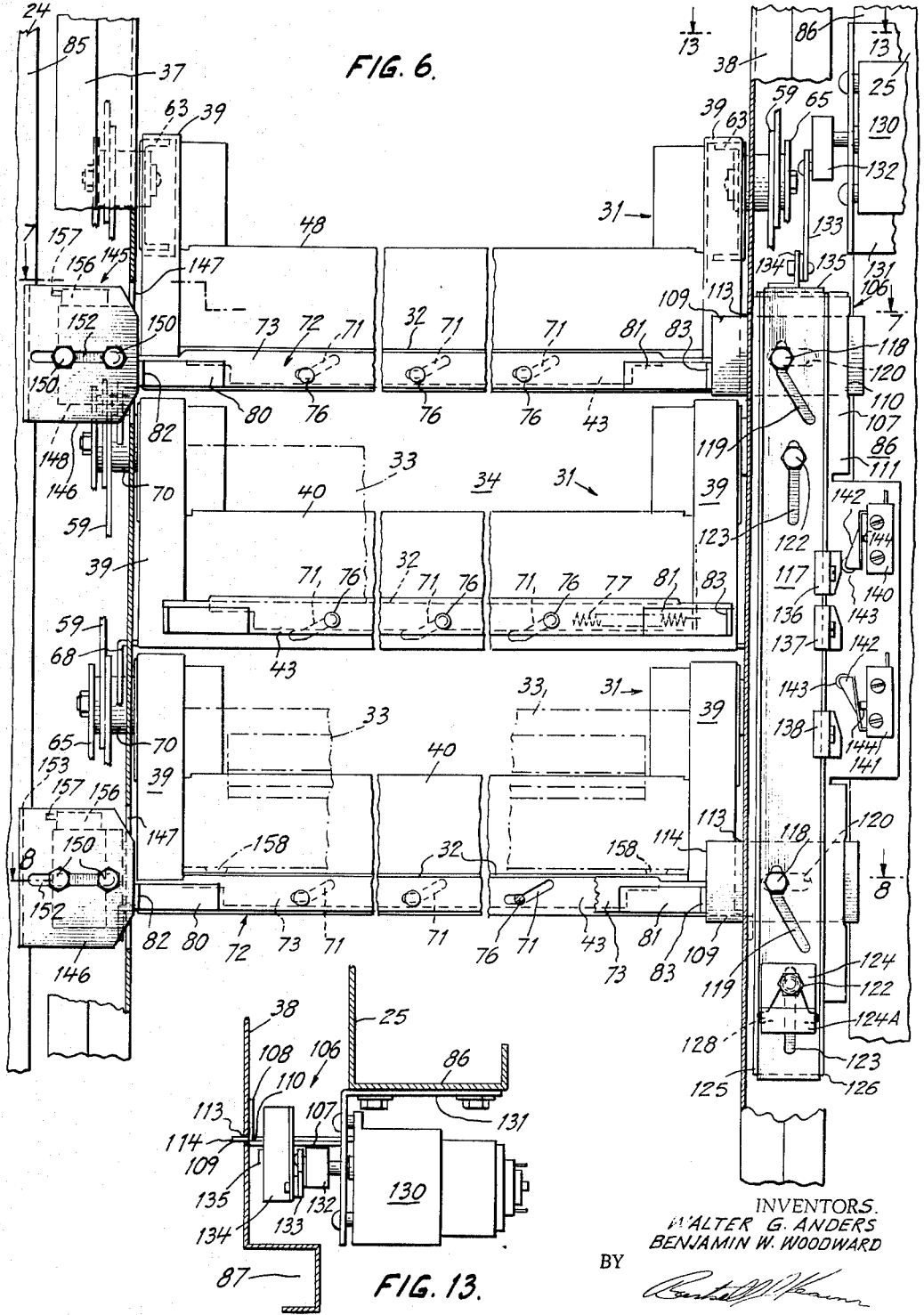

INVENTORS.
WALTER G. ANDERS
BENJAMIN W. WOODWARD.
BY
ATTORNEY

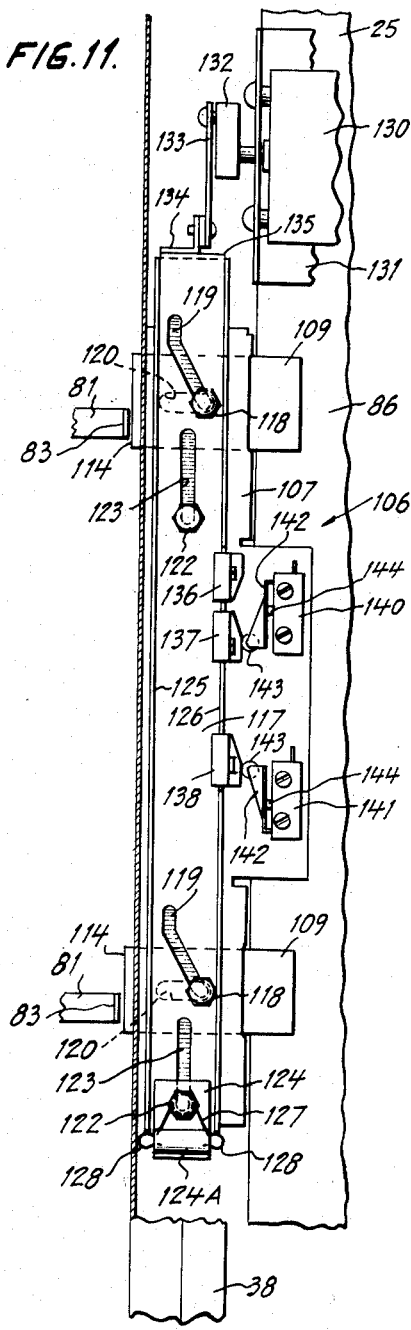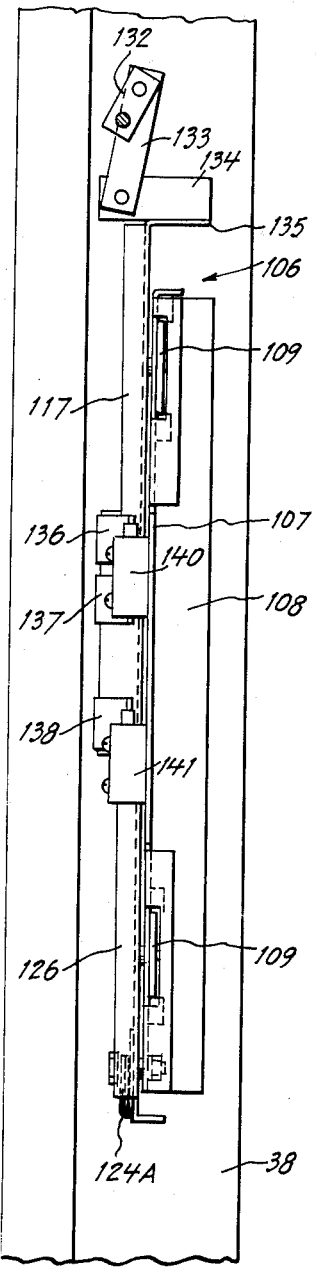

INVENTORS.
WALTER G. ANDERS
BENJAMIN W. WOODWARD
BY
ATTORNEY

United States Patent Office 3,236,577
Patented Feb. 22, 1966

3,236,577
ARTICLE CARRYING CONVEYOR DRIVEN
EQUIPMENT
Walter G. Anders and Benjamin W. Woodward, Kenmore,
N.Y., assignors to Sperry Rand Corporation, New
York, N.Y., a corporation of Delaware
Filed July 22, 1963, Ser. No. 296,694
19 Claims. (Cl. 312—223)

The present invention relates to article carrying conveyor driven equipment and more particularly to the type having a plurality of carriers mounted on a conveyor and wherein a selected carrier may be brought to a position adjacent a work station at a predetermined point along the path of conveyor travel.

In certain article carrying conveyor driven equipment as for example certain mechanized file units a plurality of card trays are disposed in side-by-side relationship on the shelf of each carrier with each carrier open at the front thereof to provide ready access to the card trays. Each carrier is usually provided with means to prevent the card trays disposed on the shelf from becoming accidentally dislodged therefrom during movement of the conveyor when an operator through use of keyboard controlled circuit means brings a selected carrier to an access opening at the front of the file unit. In some file units an integral longitudinally extending retaining lip is provided across the front of each carrier and projects above the level of the shelf. The front of each tray lies behind the retaining lip which holds the trays on the shelf during operation of the conveyor. In order to remove a selected card tray from a carrier positioned at the access opening, the tray front is first lifted over the retaining lip and then brought out onto a posting table. If the card tray is not returned to its position on the shelf behind the retaining lip, that portion of the tray extending over the retaining lip upon movement of the conveyor causes a dangerous condition to arise resulting in possible damage to the file unit and/or injury to the operator.

It is an object of this invention to provide novel means for retaining media on a carrier of a conveyor driven unit.

Another object is to provide novel means for retaining media on the shelf of a carrier of a mechanized file unit.

Another object is to provide novel retractable retaining means for a carrier of a mechanized file unit and which retaining means is automatically retracted when a selected carrier is brought to a work station adjacent an access opening in the file unit.

Another object is to provide a novel card tray retaining mechanism for the carriers of a mechanized file unit and which mechanism includes means to prevent operation of the conveyor if a card tray is improperly positioned on a carrier shelf.

A still further object is to provide a novel mechanism to release a card tray retaining device of a carrier brought to work position in the access opening of a mechanized file unit and to restore the retaining device upon selection of another carrier.

Another object is to provide novel motor operated means to lower the retaining lip of a carrier of a mechanized file unit brought to a work position therein and which means is simultaneously operable at various positions of access in the file unit.

A still further object is to provide novel circuit means for controlling the operation of a motor which actuates a novel plunger mechanism for retracting a card tray retaining lip of a selected carrier brought to work position and which motor actuates the plunger mechanism to restore the retaining lip upon selection of another carrier.

The present invention comprehends a novel retractable retaining device for containing card trays on the shelf of a carrier of a conveyor type mechanized file unit during movement of the conveyor. A novel motor-operated plunger mechanism is provided to release the card tray retaining device of a selected carrier brought to work position in an access opening of the file unit whereby the card trays are readily removable from the shelf of the selected carrier. Switch means are provided which cooperate with the plunger mechanism to interrupt the circuit to the conveyor motor during operation of the plunger mechanism. Additional plunger means are provided which cooperate with the retaining device in released position thereof to prevent further operation of the conveyor if a card tray is not properly positioned on the shelf of the carrier. In addition, circuit means are provided to obtain precise control of the operation of the plunger mechanism motor to both operate the plunger mechanism as a carrier is brought to work position and restore the mechanism prior to operation of the conveyor upon selection of another carrier.

The above and other objects and advantages of the present invention will appear more fully hereinafter from a consideration of the detailed description which follows taken together with the accompanying drawings wherein one embodiment of the invention is illustrated.

In the drawings:

FIG. 1 is a front elevational view of a mechanized file unit, in which is incorporated the present invention, with parts of the file unit broken away to show portions of the interior structure of the file unit;

FIG. 3 is a front fragmentary perspective view of a portion of the left sidewall of the file unit frame;

FIG. 3A is a front fragmentary perspective view of a portion of the left side wall and top of the file unit;

FIG. 4 is a front fragmentary perspective view of a portion of the right sidewall of the file unit frame;

FIG. 4A is a front fragmentary perspective view of a portion of the right side wall and top of the file unit;

FIG. 5 is a fragmentary perspective end view of two nested carriers with the carrier arms and stabilizer arm removed from the lower carrier;

FIG. 6 is a fragmentary sectional view taken on the line 6—6 of FIG. 2 showing in released position the card tray retaining devices of the carriers disposed at the upper and lower work stations and the right and left hand plunger mechanisms associated therewith;

FIG. 11 is an elevational view of the right hand (as seen in FIG. 6) plunger mechanism in retracted position;

FIG. 12 is a side view of the right hand plunger mechanism shown in FIG. 11;

FIG. 13 is a sectional view taken on the line 13—13 of FIG. 6;

Figure 2:
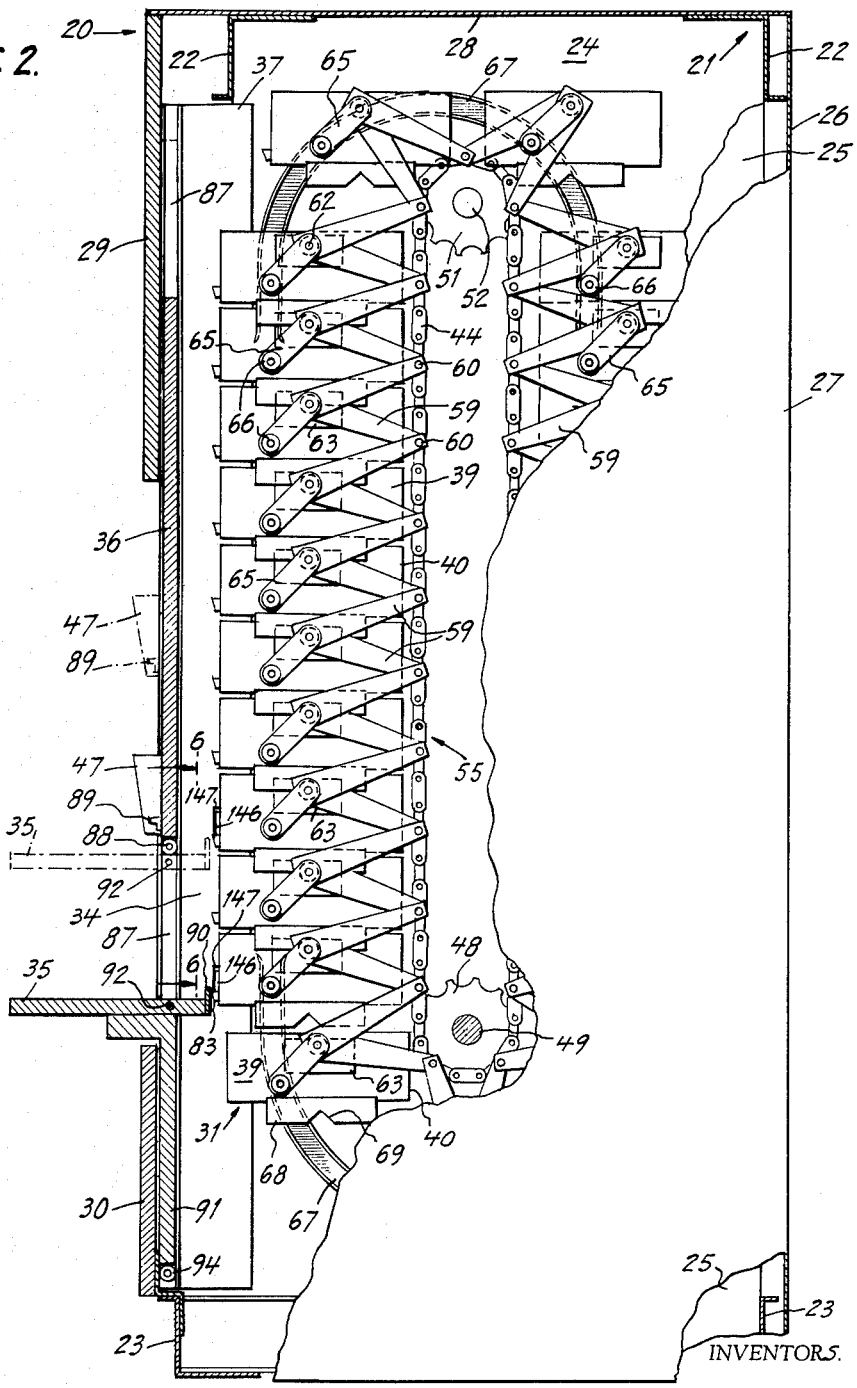
FIG. 2 is a side view of the file unit shown in FIG. 1 with portions of a side wall broken away to more particularly show diagrammatically the conveyor system of the file unit.

Referring now to the drawings for a more detailed description of the present invention a cabinet-type conveyor driven file unit is generally indicated by the reference numeral 20 in FIG. 1 and illustrates by way of example a mechanized file unit which contains an embodiment of the present invention. The housing of file unit 20 includes a main frame 21 (FIG. 2) which comprises a pair of spaced upper and a pair of spaced lower horizontal angle support members 22 and 23, respectively. Spaced side wall members 24 and 25 (partially shown in FIGS. 3, 3A, 4 and 4A), which are provided with vertical reinforcing members 24A and 25A respectively, are secured to upper and lower angle members 22 and 23 by any suitable means such as by rivets (not shown) to provide a rigid box-like frame for file unit 20. Sheet metal panels which include a rear panel 26 (FIG. 2), opposite side panels 27, a top panel 28 and upper and lower front panels 29 and 30 (FIG. 1), respectively, encase frame 21 and are secured to frame 21 by suitable fastening means (not shown) to provide an outer covering for file unit 20.

A plurality of carriers 31 (FIGS. 1 and 5) which include open shelves 32 on which are stored card trays 33 or other media such as file folders or the like are housed within file unit 20. Access to carriers 31 is provided through an opening 34 (FIGS. 1, 2 and 6) in the front of file unit 20 between upper and lower front panels 29 and 30. The position of opening 34 is variable in accordance with the hereinafter explained vertical adjustment of a posting table 35 and a cover 36, which are mounted for slidable movement in spaced vertical side guide rail members 37 and 38 (FIGS. 3 and 4) of frame 21 in a manner hereinafter explained whereby an operator has the option of working from file unit 20 at either a sitting or standing position at table 35.

Shelves 32 of carriers 31 (FIG. 5) are constructed of sheet metal or other suitable material and include spaced vertical sidewalls 39 a rear wall 40 and a bottom wall 41 (partially shown in FIG. 10) together with a longitudinal channel 42 formed in shelf 32 and which channel extends across the front edge of shelf 32. Bottom wall 41 (FIG. 10) of shelf 32 is provided with an upright longitudinal front edge portion secured to an upright front edge of shelf 32 by any suitable means such as by spotwelding to provide a longitudinally extending flange 43 across the front of each carrier 31 (FIG. 5).

Carriers 31 (FIG. 2) are suspended from spaced endless conveyor chains 44 (only one shown FIG. 2) by means of a linkage arrangement generally designated by the numeral 55 and which chains 44 and linkage arrangement 55 are associated with each side 24 and 25 as will be hereinafter described. Carriers 31 are moved either up or down (clockwise and counterclockwise respectively, FIG. 2) whereby a selected carrier 31 is positioned at access opening 34 by means of a conveyor drive mechanism which includes a sprocket-chain driving reversible motor 45 diagrammatically shown in broken lines at the lower right of file unit 20 in FIG. 1 and which motor 45 is operable through circuit control means 46 (shown as a box) which is governed by use of a keyboard 47 mounted on the lower edge of cover 36 (FIG. 1) and which keyboard includes spring return (not shown) "Up" and "Down" push buttons 47A and 47B.

For purposes of simplicity, illustrated carriers 31 are movable in either of two direction up or down by means of the said two push buttons 47A and 47B (FIG. 1) to bring a selected carrier to access opening 34 in a manner to be hereinafter explained; it being understood nevertheless that, if it is desired individual carrier selection push buttons may be provided with individual control selection circuits, actuation of which causes a selected carrier 31 to arrive at the work station via the shortest route thereto.

The drive mechanism for conveyor chains 44, and which chains 44 since they are identical at each side wall 24 and 25 description will be made hereinafter of only the arrangement at one side wall 25 (FIG. 2) includes a pair of lower spaced sprocket wheels 48 (only one shown at side wall 25 in FIG. 2) which are mounted for rotation on a main shaft 49 which extends across the width of frame 21 at the bottom of file unit 20. Main shaft 49 is journalled in frame side walls 24 and 25 (in a manner not shown) and has a portion which extends through frame side wall 25 (FIG. 1). A third sprocket wheel 50 is mounted on the extended portion of shaft 49 at the exterior of frame 21. A pair of upper sprocket wheels 51 (one of which is shown at side wall 25 in FIG. 2) each in vertical alignment with a lower sprocket wheel 48, are secured in a known manner for rotation on short shafts 52 (only one shown FIG. 2) secured to side walls 24 and 25 of frame 21. Lower sprocket wheels 48 and upper sprocket wheels 51 mesh with their respective conveyor chains 44. Lower sprocket wheels 48 constitute the driven sprocket wheels for conveyor chains 44 through third sprocket wheel 50 (FIG. 1) which is driven by a chain 53 in mesh with a sprocket wheel 54 on the drive shaft of conveyor motor 45. Operation of motor 45 accordingly effects movement of spaced conveyor chains 44 in vertical paths and then over upper and lower sprocket wheels 51 and 48 in the arcuate or non-vertical paths of movement of carriers 31.

As seen in FIG. 2, carriers 31 are interconnected to a conveyor chain 44 by scissor-like linkage arrangement 55. Linkage arrangement 55 is the same at each sidewall 24 and 25 of frame 21 and he description hereinafter set forth thereof is to only the right sidewall 25 of file unit 20.

Linkage arrangement 55 comprises an arrangement of interconnected pairs of carriers arms 59 (FIG. 2). Each arm 59 is connected at one end thereof to conveyor chain 44 and to the corresponding end of the next adjacent carrier arm 59 by fastening means, such as a pin 60 connected to chain 44. The other end of each carrier arm 59 is pivotally connected to the corresponding end of its other next adjacent arm 59 at a carrier 31 (FIG. 5) by a stud 62. Stud 62 is anchored to a bracket 63 and which bracket 63 is bolted to side wall 39 of carrier 31. One end of a stabilizer arm 65 (FIGS. 2 and 5) is rigidly attached to the end of each stud 62 adjacent the pivotal connection of carrier arms 59 on stud 62. Each stabilizer arm 65 is provided with a roller 66 rotatably mounted on the free end thereof. Arcuate guide tracks 67 (FIG. 2) are secured in a known manner to upper and lower portions of side wall 25 so that when a carrier 31 moves in a non-vertical path over a sprocket wheel 48 or 51, roller 66 of stabilizer arm 65 rides in a guide track 67 to prevent lateral swaying of a carrier 31.

Opposite sidewalls 39 of each carrier 31 are provided with a downwardly extending flange 68 (FIGS. 2 and 5) having a V-shaped notch 69 formed therein. Notch 69 engages the surface of a bearing member 70 mounted on stud 62 of the bracket 63 of the next lower carrier 31 to effect a nesting of carriers 31 in the vertical paths of movement (as shown in FIGS. 2 and 6) to prevent swaying movement of carriers 31 and to counterbalance forces exerted by the carrier load on a conveyor chain 44. When carrier 31 is moved in the arcuate path of travel the roller 66 of its stabilizer arm 65 engages an arcuate track 67 and its V-notch 69 is disengaged from bearing member 70 of the next lowest carrier.

As seen in FIG. 6 spaced inclined slots 71 are formed in flange 43 of each carrier shelf 32 with the top surface of flange 43 lying below the plane of shelf 32. An inverted U-shaped retaining lip member 72 (FIGS. 5, 6 and 10) is mounted over flange 43 with the front and rear legs 73 and 74 respectively, of retaining lip 72 embracing the opposite sides of flange 43. Legs 73 and 74 of lip member 72 are interconnected to one another by studs 76 which have their opposite ends secured to legs 73 and 74 with an intermediate portion of each stud 76 passing freely through an inclined slot 71 in flange 43 whereby lip member 72 may be moved up or down relative to flange 43. Lip member 72 is held in a normal upper limit position on flange 43 during operation of the conveyor, as shown on the intermediate carrier 31 in FIG. 6, with studs 76 engaged and maintained at the upper limits of inclined slots 71 by a spring 77 which has one end connected to an extended portion of one stud 76 (at the right in FIG. 7). The opposite end of spring 77 is hooked to a slot 78 in carrier sidewall 39. In the upper position of lip 72, rear leg 74 thereof projects above the plane of shelf 32 and lies adjacent the fronts of card trays 33 to contain card trays 33 and obstruct movement of card trays 32 on shelf 32 to prevent accidental dislodgement of card trays 33 during movement of the conveyor. Spaced rectangular plates 80 and 81 are spot welded to the front surface of retaining lip leg 73 at opposite ends thereof and each plate 80 and 81 is formed with an angled tab projection 82 and 83 respectively, bent away at a right angle from shelf 32.

Figure 7:
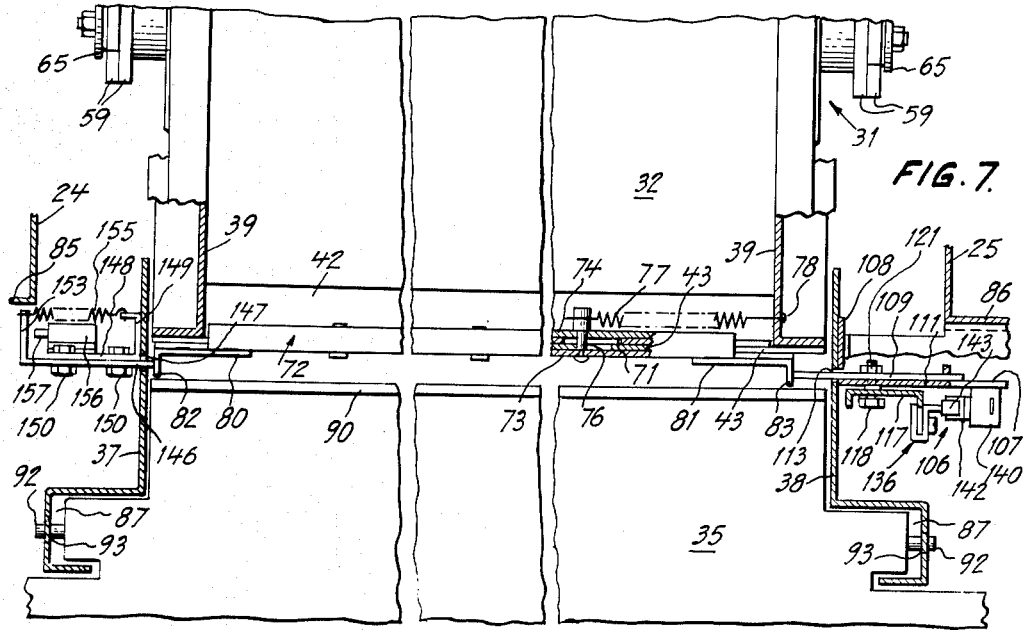
FIG. 7 is a sectional view taken on the line 7—7 of FIG. 6 showing a carrier and posting table at the upper work station.

Referring now to FIGS. 1, 3 and 4 spaced side rail members 37 and 38 of frame 21 are spotwelded to portions of spaced brackets 84 at opposite sides of access opening 34. Each bracket 84 is in turn secured to a reinforcing flange portion 85 and 86 of side walls 24 and 25 respectively. Side rail members 37 and 38 are each provided with a vertical slide channel 87 (FIGS. 2 and 7). The spaced side edges of cover 36 are mounted for slidable movement in the upper portions (FIG. 1) of spaced channels 87. Cover 36 is held in either a raised position or an intermediate position in channel 87 with the upper portion of cover 36 disposed behind front panel 29 (FIGS. 1 and 2) by any suitable means such as a spring counterbalance (not shown) and has a lower limit position in channels 87 governed by engagement of the lower corners of cover 36 with stop rollers 88 (one shown in FIG. 2) affixed to side rails 37 and 38 in channels 87. A handle 89 is provided at the lower edge of cover 36 at each side of keyboard 47 to permit an operator to raise or lower cover 36 in channels 87 with a minimum amount of effort.

Posting table 35 has a front portion extending into access opening 34 (FIGS. 2 and 7) and is provided with a longitudinal upright metal strip 90 along its edge extending inwardly of opening 34 to prevent record cards or the like from accidentally dropping into the housing from table 35. An apron portion 91 is provided for table 35 and has an upper marginal portion (FIG. 2) secured to table 35 and extends downwardly at a right angle from table 35 (FIG. 2). The spaced vertical side edges of apron 91 are slidably mounted in the lower portions of spaced guide rail channels 87 behind lower front panel 30. Table 35 is maintained in an upper limit position in channels 87 (as shown in phantom in FIG. 2) by any well known means such as a spring equalizer structure (not shown) and by latch rods 92 which engage in holes 93 (FIG. 7) provided in each channel 87. Rods 92 are manually movable in or out of holes 93 by appropriate mechanism (not shown) whereby the latch rods 92 simultaneously are disengaged from the holes 93 to permit manual displacement of the table within opening 34. When table 35 is moved to its lower limit position as shown in FIGS. 1 and 2, rods 92 are located in additional holes (not shown) provided in channels 87. Stop rollers 94 (one shown in FIG. 2) are affixed to the bottom of each channel 87 to engage lower spaced corners of apron 91 in the lower limit position of table 35.

It will be apparent from the above description that table 35 and cover 36 may be shifted in channels 87 to provide both upper and lower work stations adjacent opening 34 in file unit 20 whereby an operator at his option may work from a selected carrier 31 in either a sitting or standing position at table 35. When table 35 and cover 36 are at their lower limit positions (FIGS. 1 and 2) two carriers 31 are exposed in opening 34. If table 35 and cover 36 are moved to their upper limit positions in channel 87 (as shown in phantom in FIG. 2) two carriers 31 will also be exposed in opening 34. At either the upper or lower limit positions of table 35, shelf 32 of the lower of the two carriers 31 then exposed in access opening 34 lies in the plane of the top of upright strip 90 on table 35 and is the carrier from which the operator selects a desired card tray 33.

A plunger mechanism 106 (FIG. 6) is provided for simultaneously releasing retaining lips 72 of the carriers 31 brought to position at both the upper and lower limit positions of table 35, since for example when the operator is working from table 35 at the lower work station, cover 36 is at its lower limit position and hides from view the carriers 31 then at the upper work station. On the other hand, if table 35 and cover 36 are at their upper limit positions, at the upper work station, apron 91 hides from view the carrier 31 then at the lower work station.

Plunger mechanism 106, as shown at the right in FIG. 6, includes a vertical L-shaped mounting bracket 107 having a foot portion 108 (FIG. 13) secured to the rear surface of side rail member 38 adjacent access opening 34 by any suitable means such as by spotwelding. A pair of spaced plunger plates 109 are mounted for horizontal movement in pairs of spaced aligned slots 110 (FIGS. 6 and 8) provided in bracket 107 on the rear surface of mounting bracket leg 111 between plastic guide strips 112 (FIG. 9) secured to bracket leg 111. Plates 109 extend into access opening 34 (FIG. 6) at the upper and lower work stations through slots 113 provided in side rail 38 and which slots 113 register with slots 110 of bracket 107 so that the leading edges 114 of plunger plates 109 are each in alignment with angled tab projections 83 of the carriers 31 positioned at the upper and lower limit positions of table 35 (FIG. 2).

Figure 8:
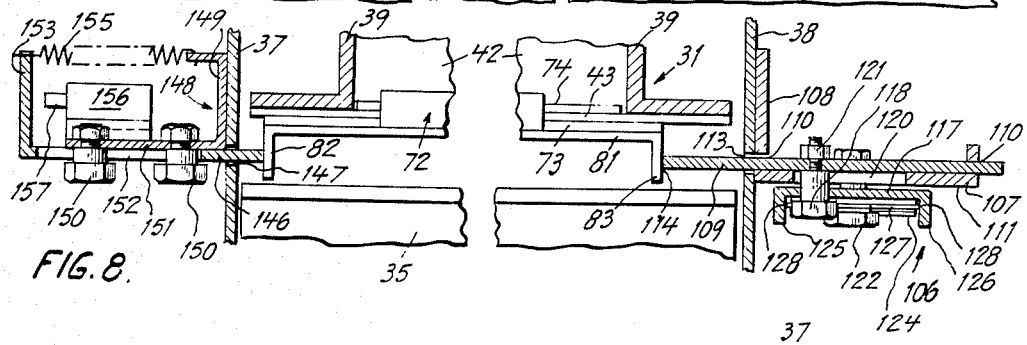
FIG. 8 is an enlarged sectional view taken on the line 8—8 of FIG. 6.

A plunger plate actuator bar 117 is mounted for vertical movement on the front surface (FIG. 6) of mounting bracket leg 111 and is held against bracket 107 by the heads of spaced studs 118. Studs 118 each pass freely through one of a pair of spaced elongated inclined slot 119 in actuator bar 117 and thence through an elongated horizontal slot 120 in bracket leg 111 (FIG. 8). As seen in FIG. 8 a threaded end of stud 118 is anchored to plunger plate 109 and secured thereto by a nut 121. Spaced guide bolts 122 (FIGS. 6 and 8) are anchored to bracket leg 111 and have portions disposed in spaced elongated vertical slot 123 of actuator bar 117 with the heads of the bolts bearing against bar 117 to insure vertical movement of bar 117 on bracket 107 as will hereinafter be described. A plate 124 (FIGS. 6 and 8) is secured to lower guide bolt 122 between side flanges 125 and 126 of actuator bar 117. Plate 124 has an inturned marginal portion 124A which bears against the arms of a coil spring 127 and which coil spring 127 is connected at its apex portion to the lower of the guide bolts 122 (FIG. 6). The free ends of the arms of coil spring 127 are provided with bowed portions 128 and which bowed portions 128 in the lower limit position of bar 117 (FIGS. 6 and 8) on bracket 107 are disposed against the sides of spaced vertical flanges 125 and 126 of bar 117.

Actuator bar 117 is movable on bracket 107 between lower and upper limit positions (FIGS. 6 and 11 respectively). In movement of bar 117 from lower to upper limit position edges of inclined slots 119 of bar 117 are in camming engagement with studs 118 anchored to plunger plates 109 and drive studs 118 whereby plates 109 are moved to the right (FIG. 6) in guide rail slots 113 of side rail 38 and out of contact with tab projections 83 of the carriers 31. In the upper limit position of bar 117 (FIG. 11) bowed portions 128 bear against the lower edges of flanges 125 and 126 to hold actuator bar 117 in the upper limit position. In the course of downward movement of bar 117 from upper to lower limit position (FIG. 6) on bracket 107 the arms of coil spring 127 are compressed whereby bowed portions 128 are moved between and bear against the sides of flanges 125 and 126 and the edges of inclined slots 119 engage studs 118 and cam plunger plates 109 to the left (FIG. 6) in slots 113.

An A.C. motor 130 (FIGS. 1 and 6) for effecting vertical movement of bar 117 on mounting bracket 107 is mounted on an angle member 131 (FIGS. 4 and 6) and is disposed above bracket 107 and which angle member 131 is bolted to flange 86 of frame sidewall 25. A block member 132 (FIG. 6) is secured to the shaft of motor 130 and to which block member 132 is pivotally connected one end of a crankarm 133. The opposite end of crankarm 133 is secured to an angle 134 (FIGS. 11 and 12) affixed to an inturned upper marginal portion 135 of actuator bar 117.

As seen in FIGS. 6 and 11, spaced angled cam members 136, 137 and 138 respectively are secured to flange 126 of actuator bar 117. Mechanical switches 140 and 141 are fastened to an extended portion of bracket leg 111 and each of said switches 140 and 141 include a spring arm 142 provided with a roller 143 at the free end of spring arm 142. Switch 140 is positioned for actuation by cams 136 and 137 in the course of movement of bar 117 and when actuated by either cam 136 and 137 in a manner to be hereinafter explained roller 143 on spring arm 142 rides up on the cam whereby switch arm 143 engages and depresses switch button 144 to actuate switch 140 to an open condition. Switch 141 is positioned for actuation by cam 138 to closed condition when cam 138 engages roller 143 on spring arm 142 to depress switch button 144 of switch 141.

At the left of access opening 34 (FIGS. 1 and 6) an additional plunger mechanism 145 is provided. Plunger mechanism 145 includes spaced movable plunger plates 146 which extend into access opening 34 at each limit position of table 35, through slots 147 provided in side rail member 37 and in alignment with adjacent tab 82 of the carriers 31 stopped at the upper and lower work station. A mounting bracket 148 (one shown in FIG. 3) is provided for each plunger plate 146 and has a foot portion 149 secured to the rear surface of guide rail 37 by any suitable means such as by spotwelding. A pair of spaced studs 150 are anchored to the leg 151 of each bracket 148 and pass freely through an elongated horizontal slot 152 (FIG. 8) in plate 146 to slidably mount plate 146 on leg 151 of bracket 148. A marginal portion 153 of each plate 146 is bent at a right angle (FIG. 8) to the body portion of plate 146. One end of a spring 155 is hooked to marginal portion 153 and the opposite end of spring 155 is connected to a flange provided on foot 149 of bracket 148 whereby plate 146 is urged to the right (FIGS. 6 and 8). A switch 156, is secured to the upper portion of each bracket 148 with a switch button 157 thereof positioned for actuation by marginal portion 153 of plate 146.

As shown in FIG. 6 with carriers 31 at rest, actuator bar 117 is at its lower limit position on mounting bracket 107. Leading edges 114 of both plunger plates 109 are in engagement with angled tab projections 83 of retaining lips 72 of carriers 31 halted at the upper and lower limit positions of posting table 35 so that the retaining lips 72 thereof are maintained in a lower or released position on flange 43 with studs 76 at the lower limits of inclined slots 71 of flange 43. Plates 109 are held in extended position in access opening 34 by the engagement of studs 118 with the upper edges of inclined slot 119 of actuator bar 117. Tab projections 82 at the other end of lip 72 (at the left in FIG. 3) are engaged with the leading edges of plates 146 whereby plates 146 are moved to the left (FIGS. 6 and 8) so that marginal portions 153 of both plates 146 are moved away from buttons 157 of switches 156 opening said switches. Switch 140 is engaged and actuated by cam 136 on actuator bar 117 maintaining switch 140 in open condition. Switch 141 is disengaged from its actuating cam 138 and in open condition.

Figures 9, 10:
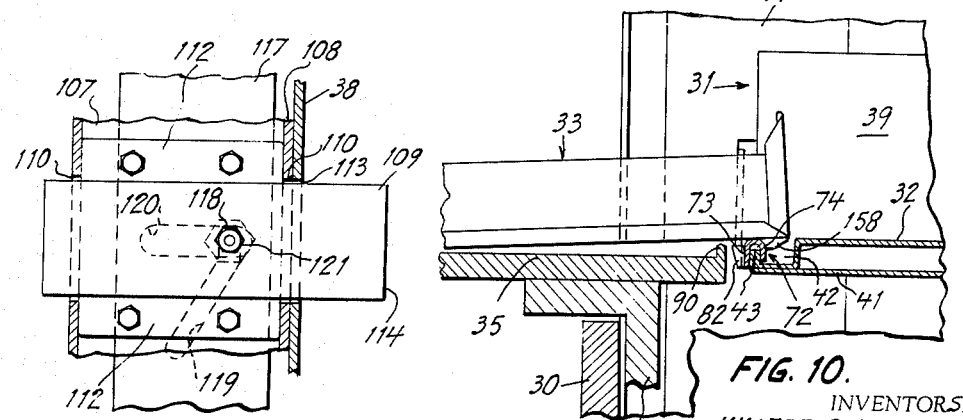
FIG. 9 is a fragmentary rear view of a retracted right hand plunger plate and mounting bracket.
FIG. 10 is a fragmentary end view of a carrier at the lower work station with a card tray in partially extended position on the posting table.

In released position the top surface of lip 72 lies in the plane of the carrier shelf 32 (FIG. 10) whereby a card tray 33 may be readily brought out of the carrier 31 at the selected work station onto table 35 without lifting the tray over the lip. As seen in FIG. 10 when a card tray 33 is extended onto table 35, blisters 158 which are formed on the rear bottom edge of card tray 33 drop into channel 42 of shelf 32 and engage the rear leg 74 of lip 72 to prevent further movement of the tray unless blisters 158 are lifted out of channel 42.

Figure 14:
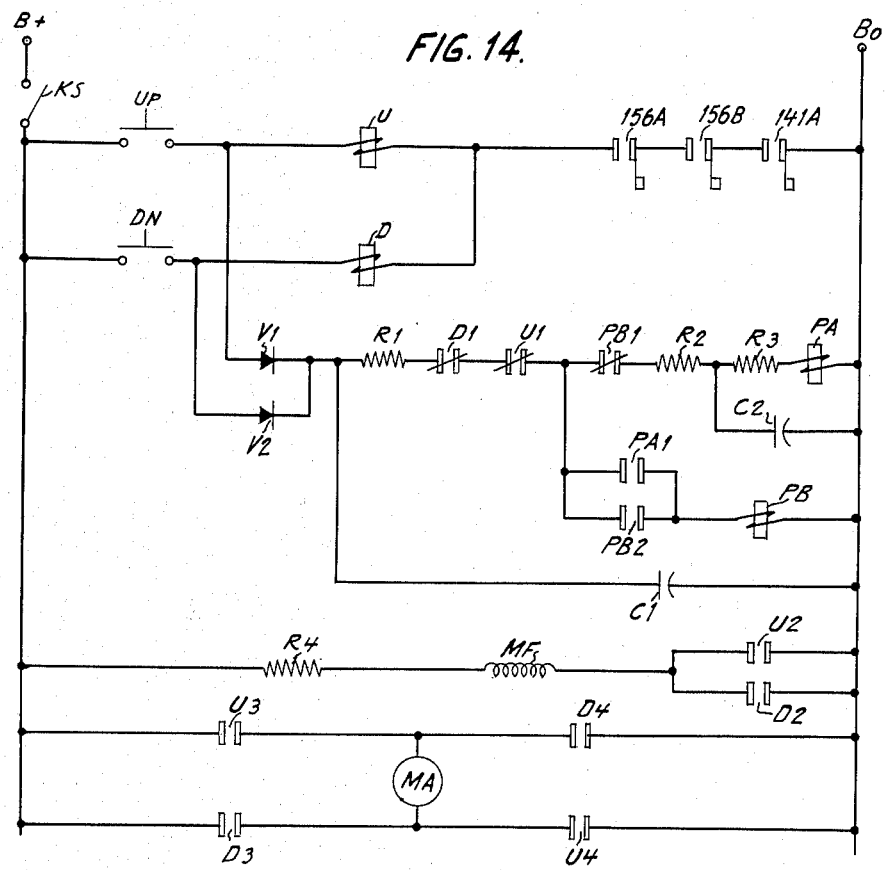
FIG. 14 is a schematic wiring diagram for the conveyor system of FIG. 2 showing the power and control circuit for the conveyor motor in across the line form.

Referring to FIG. 14, undirectional power is supplied from a conventional power source (not shown) over supply lines B+, Bo to the conveyor power and control circuits illustrated. MA designates the conveyor motor armature (of conveyor motor 45 of FIG. 1), while MF designates the motor field windings. Push button switches for directional control of the conveyor motor are designated UP and DN for the up and down directions, respectively, of conveyor travel, and correspond to up and down push buttons 47A and 47B, respectively, of FIG. 1.

Electromagnetic relays used in the controls are designated as follows: U-up relay, D-down relay, PA-first pulsing relay and PB-second pulsing relay. These identifying letters are applied to the coils (FIG. 14) of the relays and, with suffix numerals appended thereto, are applied to the contacts of the relays to differentiate between different sets of contacts on the same relay; all relay contacts being shown for the unoperated condition of the relays.

Resistors are generally designated R, capacitors C and rectifiers V, with numeral suffixes being appended thereto to distinguish similar circuit components, one from the other. KS designates a manual knife switch connected in supply line B for disconnecting and connecting the conveyor power and control circuitry from the power supply (not shown). Connected across coil PA of the first pulsing relay is an R-C timing circuit, consisting of resistor R3 and capacitor C2. The values of timing resistor R3 and timing capacitor C2 are selected so as to delay the release of relay PA for a predetermined time measured from the removal of applied power to the relay energizing coil, for purposes to be explained hereinafter.

Mechanical switch contacts 156A, 156B and 141A designate the contacts of switches 156 (two switches) and cam actuated switch 141 (FIG. 6), respectively; the contacts being shown in their normally open condition for the unactuated condition (previously described) of their respective switches.

Figure 15:
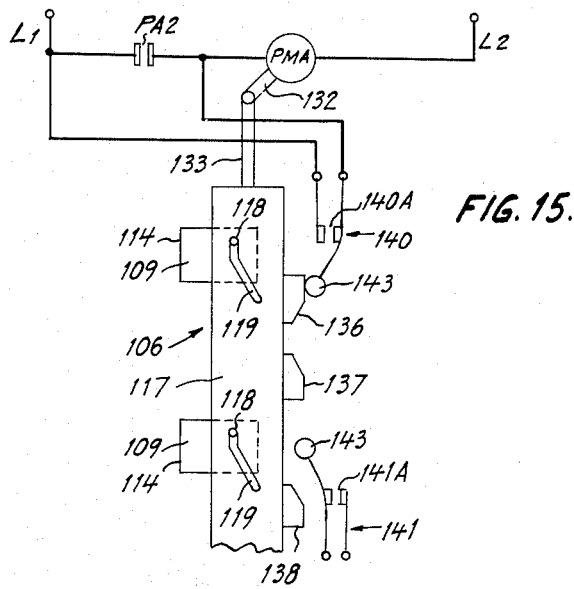
FIG. 15 is a diagrammatic view of the right hand plunger mechanism and a schematic wiring diagram for the plunger motor in across the line form.

Referring to FIG. 15, alternating power from any suitable conventional source (not shown) is supplied over lines L1, L2 to the power and control circuits of plunger motor 130 (FIG. 6). In FIG. 15, PMA designates the plunger motor armature; the motor field windings, for purposes of simplicity, being omitted. An energizing circuit may be completed for armature PMA through either normally open contacts PA2 of the first pulsing relay or contacts 140A of mechanical, cam actuated switch 140, which switch is shown in actuated condition (contacts 140A open).

Plunger mechanism 106 of FIG. 6 is also shown schematically in FIG. 15 wherein the plunger components bear the same numeral designations as in FIG. 6. Actuator bar 117 (FIG. 15) of the plunger mechanism is shown in its lower limit position. Under such conditions, contacts 141A of cam actuated, mechanical switch 141 are in their normally unactuated (open) condition.

*Operation*

Assume that the conveyor is at rest with a carrier 31 positioned at the lower work station and one positioned at the upper work station as shown in FIG. 6. The retaining lips 72 of the carriers 31 at such work stations are maintained at their lower limits on flanges 43 of their respective carriers 31. Under such conditions, switches 156 of plunger mechanisms 145 and cam actuated switch 141 of plunger mechanism 106 are in unactuated condition, as was previously stated. Thus, their respective switch contacts 156A, 156B, 141A (FIG. 14) are presently open in the energizing circuits of the coils U and D of the conveyor directional control relays. In addition cam 136 (FIG. 6) on bar 117 actuates mechanical switch 140, maintaining its contacts 140A (FIG. 14) open.

Next assume that the operator desires to bring a selected carrier 31 to one of the work stations say, for example, the lower station (FIG. 2) by driving the conveyor in the up direction (clockwise in FIG. 2). Under such conditions he closes knife switch KS (FIG. 14) to supply power to the conveyor power control circuits. He then depresses and maintains depressed push button UP, preparing an energizing circuit for coil U of the up direction relay and completes an energizing circuit for coil PA of the first pulsing relay; the latter circuit extending from supply line B+, through manual switch KS, push button UP, rectifier V1, current limiting resistor R1, presently closed contacts D1 of the down relay, U1 of the up relay, and PB1 of the second pulsing relay and resistor R2 and timing resistor R3, coil PA of the first pulsing relay to supply line Bo, and through timing capacitor C2 to supply line Bo, completing a charging circuit for capacitor C2 which charges to full capacity. In addition, a charging circuit is completed for capacitor C1 which charges to full capacity for purposes to be hereinafter explained.

Relay PA, upon operation, closes its contacts PA1 (FIG. 14) and PA2 (FIG. 15). Contacts PA1 (FIG. 14) upon closing, complete an energizing circuit for coil PB of the second pulse relay. Relay PB, upon operation, closes its contacts PB2 to establish a self holding circuit for its coil PB and opens its contacts PB1 interrupting the energizing circuit of coil PA of the first pulsing relay. However, relay PA is maintained energized through the discharge of capacitor C2 through timing resistor R3 and its coil PA.

Contacts PA2 (FIG. 15) in closing complete an energizing circuit for armature PMA of the plunger motor (shown as 130 in FIG. 6) from line L1 to line L2. Motor 130 (FIG. 6) upon rotation actuates crank arm 133 driving actuator bar 117 upward toward its upper limit position (FIG. 11). As bar 117 (FIG. 15) is driven upwardly roller 142 of switch 140 rides off cam 136, closing contacts 140A of switch 140, thereby establishing a second energizing circuit for motor armature PMA across supply lines L1 to line L2.

When capacitor C2 (FIG. 14) has discharged sufficiently, through timing resistor R3 and coil PA, relay PA releases, reopening its contacts PA1 in the circuit of coil PB, but without effect, since contacts PB2 are presently closed as has been previously described. In addition, relay PA also opens its contacts PA2 (FIG. 15) interrupting one of the energizing circuits for motor armature PMA, but without effect.

It is to benoted that timing resistor R3 and timing capacitor C2 (FIG. 14) must be selected of such value to maintain relay PA operative upon interruption of the energizing circuit of its coil PA for a sufficient time to insure that actuator bar 117 is driven sufficiently upward to cause contacts 140A of switch 140 to engage and complete an alternate circuit for motor armature PMA to maintain plunger motor 130 (FIG. 6) operative to drive bar 117 towards its upper limit position.

Upon opening of contact PA2 (FIG. 15) plunger motor PMA remains energized through the circuit from line L1 to line L2 established through closed contacts 140A of switch 140 and operates through a one half revolution during which movement crankarm 133 drives actuator bar 117 to its upper limit position on mounting bracket 107 (FIG. 11). Actuator bar 117 in the course of its upward movement retracts plunger plates 109 to the right (FIG. 6) in slots 110 and 113 through the camming engagement of the edges of inclined slots 119 with studs 118, as previously described, thereby releasing the lowered retaining lips 72 of the carriers then at the upper and lower work stations of table 35. Lips 72 restore to upper position on flanges 43 by springs 77 to lie adjacent the fronts of the card trays 33 disposed on their carriers 31. Plunger plates 146 of plunger mechanism 145 are released as lips 72 restore to upper position and springs 155 move plates 146 to the right (FIG. 8) whereby marginal portions 153 thereof engage and actuate both switches 156 closing switch contact 156A and 156B (FIG. 14) of the conveyor directional control circuit. As actuator bar 117 restores to upper position (FIG. 11) cam 137 on bar 117 engages switch 140 and reopens switch contacts 140A thereby interrupting plunger motor circuit (FIG. 15) stopping motor 130 at the end of the first one half revolution thereof. Simultaneously cam 138 actuates switch 141 closing switch contacts 141A (FIGS. 14 and 15).

Contacts 141A (FIG. 14) upon closing complete an energizing circuit for coil U of the up relay; the circuit extending from switches KS and UP, coil U, and mechanical switch contacts 156A, 156B and 141A (all presently closed). Relay U, upon operation, closes its contacts U2 energizing the conveyor motor field MF and closes its contacts U3 and U4 energizing the motor armature MA for "up" direction of conveyor travel. Motor armature MA rotates, driving the conveyor in an up direction. Relay U also opens its contacts U1 interrupting the energizing circuit for coil PB of the second pulse relay. Relay PB upon releasing reopens its self holding contacts PB2, without effect, and releases its contacts PB1 preparing an energizing circuit for coil PA for subsequent operation.

As the selected carrier 31 arrives at the lower work station, the operator release up push button UP opening contacts UP (FIG. 14) interrupting the energizing circuit of coil U and the charging circuit of capacitor C1. Control relay U releases its contacts U2, U3 and U4 deenergizing the conveyor motor which stops. Relay U also releases and recloses its contact U1 completing a discharge circuit for capacitor C1 through resistor R1 contacts D1, U1 and PB1 (all presently closed), and through coil PA and capacitor C2 to supply line Bo. Capacitor C1 is selected of such value sufficient upon discharge thereof to recharge capacitor C2 and reenergize coil PA. Relay PA upon reoperation closes its contacts PA1 (FIG. 14) and PA2 (FIG. 15). As contacts PA1 reclose coil PB is energized to operate relay PB opening contacts PB1 and interrupting the energizing circuit of coil PA. However, relay PA is maintained energized through discharge of capacitor C2 through timing resistor R3 and its coil PA sufficient to maintain contacts PA2 (FIG. 15) closed completing an energizing circuit for armature PMA of plunger motor (shown as 106, FIG. 11) from lines L1 to L2 to pulse armature PMA to initiate the second half revolution of armature PMA whereby crank arm 133 drives actuator bar 117 downward towards its lower limit position (FIG. 6). As bar 117 (FIG. 11) is driven downward roller 142 of switch 140 rides off cam 137 closing contacts 140A (FIG. 15) of switch 140 establishing an alternate energizing circuit for motor armature PMA. As switch 140 is released from cam 137 the energy stored on capacitor C1 is dissipated to deenergize relay PB. Capacitor C2 having been charged by current from capacitor C1 also is dissipated to deenergize relay PA which opens contacts PA1 and PA2.

Plunger motor 130 (FIG. 14) remains energized through the circuit established from L1 to L2 through motor armature PMA and closed contacts 140A and completes its revolution driving actuator bar 117 downward. Roller 142 of switch 140 rides off cam 138 opening contacts 141A in conveyor power and control circuit (FIG. 14). Plates 109 are driven to the left (FIGS. 1 and 6) in the manner previously described during the downward movement of bar 117 by the camming engagement of the edges of inclined slots 119 with studs 118 whereby plates 109 engage tab projections 83 of the retaining lips 72 of the carriers 31 brought to the upper and lower limit positions of table 35 lowering lips 72 thereof in inclined slots 71 of flanges 43 whereby a card tray 33 may be readily removed from shelf 32 of the carrier 33 at work position at table 35. Tab projections 82 of lips 72 of the carriers drive plates 146 of plunger mechanism 145 to the left (FIG. 6) whereby plate marginal portions 153 disengage and open switches 156 opening switch contacts 156A and 156B (FIG. 14). As actuator bar 117 reaches lower limit position on bracket 107 cam 136 reengages and actuates switch 140 opening switch contacts 140A (FIG. 15) interrupting the energizing circuit of plunger motor 130 which stops preparing the circuitry described for condition preparatory to another cycling of the conveyor.

Next assume that the operator desires to bring a carrier 31 to a selected work station of table 35 by driving the conveyor in the down direction (counterclockwise in FIG. 2). Under such circumstances the operator depresses and maintains depressed down push button DN (designated Down push button 47B in FIG. 1) completing an energizing circuit for coil PA of the first pulsing relay through rectifier V2. The sequence and operation of relays PA and PB are the same for the "down" operation as was described for the "up" operation whereby plunger motor armature PMA (FIG. 15) is energized to operate crank arm 133 moving actuator bar 117 to its upper limit position on bracket 107 restoring plunger plates 109 to the right (FIG. 6). Retaining lips 72 of the carriers 31 then at the upper and lower work stations are restored to upper position releasing plates 146 whereby plate marginal portions 153 actuate switches 156 closing contacts 156A and 156B (FIG. 14) in the conveyor power and control circuit. As bar 117 reaches its upper limit position cam 137 actuates switch 140 opening switch contacts 140A. Cam 138 actuates switch 141 to close contacts 141A whereby an energizing circuit is completed for coil D from line B+ to Bo through DN switch contacts, coil D, and closed switch contacts 156A, 156B and 141A.

Relay D upon operation closes its contacts D2 energizing motor field MF and closes its contacts D3 and D4 energizing the motor armature MA for "down" direction of conveyor travel. Relay D also opens its contact D1 interrupting the energizing circuit for coil PB of the second relay PB pulse in the manner described in the "up" operation.

As the desired carrier 31 arrives at the selected work station the operator releases down push button DN interrupting the energizing circuit of coil D. Control relay D releases its contacts D2, D3 and D4 deenergizing the conveyor motor which stops.

Capacitor C1 discharges in the manner previously described for the "up" operation to recharge relay PA to pulse plunger motor PMA whereby actuator bar 117 is driven downward camming plate 109 to lower the retaining lips 72 of the carriers brought to the upper and lower work stations, opening switches 156 and switch 141 as described with regard to the "up" operation. Plunger motor operates until cam 137 opens switch 140 whereby the circuitry is prepared for another cycling of the conveyor.

It is apparent from the foregoing that the novel retaining means described has many advantages in use. One advantage is that if a card tray 33 or other media is left in an extended position over a retracted lip 72, as shown in FIG. 10, and assuming an operator depresses up push button 47A to bring a selected carrier 31 to work position conveyor motor 45 cannot be energized to move the conveyor until the tray is returned to position behind the lip 72 on shelf 32. Under such conditions plunger motor 130 is energized as previously described for an "up" operation and plunger plates 109 are retracted to the right (FIG. 6) by actuator bar 117 as it is restored to upper position on bracket 107, however, spring 77 after release of plate 109 will not restore lip 72 to upper position against the weight of card tray 33 on lip 72. Tab projections 82 of the lip 72 therefore hold plate 146 of plunger mechanism 145 in moved position whereby switch 156 associated therewith cannot be actuated to close its contacts in the conveyor power and control circuit (FIG. 14) to energize motor 45. Under such conditions coil U cannot be energized to operate relay U until the extended card tray 33 is restored behind lip 72 whereby lip 72 is freed to allow spring 77 to restore lip 72 to upper position on flange 43 thereby causing plate 146 to move to the right (FIG. 6) to actuate its associated switch 156 whereby coil U is energized to energize conveyor motor 45 as previously described.

The term media has been used in the foregoing description to designate articles which may be carried by conveyor driven equipment and it should be understood that such term will include among others, card trays, folders, note books, drawings, papers, etc.

Although one embodiment of the present invention has been illustrated and described in detail, it is to be expressly understood that the invention is not limited thereto. Various changes can be made in the design and arrangement of parts without departing from the spirit and scope of the invention as the same will now be understood by those skilled in the art.

What is claimed is:
1. In combination,
 (a) a conveyor movable in an endless loop path of travel,
 (b) a work station at a predetermined place along the path of conveyor travel,
 (c) a plurality of individual carriers having media stored thereon and connected for movement with said conveyor for transporting said media to said work station,
 (d) control means for said conveyor for controlling operation of said conveyor and effecting the stopping and starting of said conveyor and said carriers,
 (e) media retaining means for said carriers being selectively operable to media containing and media releasing conditions, said retaining means in said media containing condition obstructing movement of said media from said carriers and in said media releasing condition removing said obstructions to said media whereby said media is readily removable from said carriers,
 (f) first means for effecting operation of said retaining means to either of said two conditions, and
 (g) second means operable in response to said control means to effect operation of said first means,
 (h) said second means being operable in response to operation of said control means under conditions when said control means operates to stop said conveyor and a said selected carrier at said work station to cause said first means to operate the media retaining means provided for said selected carrier to said media releasing condition,
 (i) said second means being further operable in response to said operation of said control means under conditions when said control means operates to restart said conveyor to cause said first means to operate said media retaining means for said selected carrier positioned at said work station from said media releasing condition to said media containing condition prior to movement of said conveyor.
2. In combination,
 (a) a conveyor movable in a predetermined endless loop path of travel,
 (b) a work station at a predetermined place along the path of conveyor travel,
 (c) a plurality of individual carriers having media stored thereon and connected for movement with said conveyor for transporting media to said work station,
(d) control means for said conveyor for controlling operation of said conveyor and effecting the starting and stopping of said conveyor to position a selected carrier at said work station,
(e) a retaining lip member mounted on each of said carriers and selectively operable for movement to spaced limit positions thereon,
(f) said retaining lip members when in a first of said spaced limit positions containing said media on said carriers to obstruct movement of said media from said carriers and when in said other limit positions removing said obstructions to said media wherein said media is readily removable from said carriers,
(g) first means for effecting said selective operation of said lip member to said spaced limit positions, and
(h) second means operable in response to operation of said control means under conditions when said control means operates to stop said conveyor and position said one of said carriers at said work station to cause operation of said first means to effect movement of the lip member provided for said one carrier to said media releasing position,
(i) said second means being further operable in response to operation of said control means under conditions when said control means operates to restart said conveyor to cause operation of said first means to effect operation of said retaining lip member for said one carrier to move to said media containing position prior to movement of said conveyor.

3. In combination,
(a) a conveyor movable in a predetermined endless loop path of travel,
(b) a work station at a predetermined place along the path of conveyor travel,
(c) a plurality of individual carriers having media stored thereon and connected for movement with said conveyor for transporting media to said work station,
(d) control means for said conveyor for controlling operation of said conveyor and effecting the starting of said conveyor and the stopping of said conveyor to position a selected carrier at said work station,
(e) a retaining lip member mounted on each of said carriers and selectively operable for movement to spaced limit positions thereon,
(f) said retaining lip members when in a first of said spaced limit positions containing said media on said carriers to obstruct movement of said media from said carriers and when in said other limit positions adapted for releasing said media wherein said media is readily removable from said carriers,
(g) a plunger motor,
(h) a plunger member being positioned with respect to said conveyor so as to be in alignment with the retaining lip member of a said carrier stopped at said work station,
(i) linkage means connecting said plunger motor to said plunger member,
(j) energizing means for said plunger motor operable in response to operation of said control means under conditions when said control means operates to stop said conveyor and a selected carrier at said work station for energizing said plunger motor to drive said linkage means whereby said plunger member is moved by said linkage means to engage and actuate said retaining lip member of said selected carrier to said media releasing position, and
(k) arresting means responsive to movement of said linkage means to deenergize said plunger motor upon said actuation of said retaining lip member,
(l) said energizing means being further operable in response to operation of said control means under conditions when said control means operates to restart said conveyor to energize said plunger motor to drive said linkage means to effect actuation of said retaining lip member of said selected carrier to media containing position.

4. The combination of claim 3 wherein said arresting means includes switch means in circuit with said plunger motor, and said combination further including cam means associated with said linkage means, said cam means controlling operation of said switch means during movement of said linkage means.

5. The combination of claim 3 wherein said linkage means include an actuator bar having an inclined slot therein, a crank arm connecting said actuator bar to said plunger motor to drive said actuator bar upon operation of said plunger motor, and said combination further including a bolt anchored to said plunger member and having a portion extending through said inclined slot and in camming engagement with the side edges of said inclined slot in said actuator bar whereby movement of said actuator bar causes movement of said plunger member.

6. In combination,
(a) a conveyor movable in a predetermined endless loop path of travel,
(b) a work station at a predetermined place along the path of conveyor travel,
(c) a plurality of individual carriers having media stored thereon and connected for movement with said conveyor for transporting media to said work station,
(d) control means for said conveyor for controlling operation of said conveyor and effecting the starting and stopping of said conveyor and carriers,
(e) a retaining lip member mounted on each of said carriers and selectively operable for movement to spaced limit positions thereon,
(f) said retaining lip members when in a first of said limit positions containing said media on said carriers obstructing movement of said media from said carriers and when in said other limit position being adapted for releasing said media whereby said media is readily removable from said carrier,
(g) a plunger motor,
(h) a plunger member being positioned with respect to said conveyor so as to be in engagement with the retaining lip member of one of said carriers stopped at said work station to maintain said lip member in said releasing condition,
(i) linkage means connecting said plunger motor to said plunger member,
(j) plunger motor energizing means operable in response to operation of said control means when the latter is operated to start said conveyor for energizing said plunger motor to drive said linkage means whereby said plunger member is moved by said linkage means to effect actuation of said retaining lip member to media containing condition, and
(k) arresting means responsive to movement of said linkage means to deenergize said plunger motor and arrest movement of said plunger member upon said actuation of said retaining lip member to said media containing condition.

7. In a file unit of the class described,
(a) a housing having an access opening provided in one side thereof,
(b) a conveyor in said housing movable in an endless loop of travel,
(c) a plurality of carriers connected to said conveyor and having media stored thereon,
(d) means for controlling operation of said conveyor to move said carriers to and past said access opening to position a selected carrier of said plurality of carriers in said access opening,
(e) movable retaining means on said selected carrier operable to a first limit position thereon to obstruct movement of said media on said carrier under conditions where said selected carrier is positioned away from said access opening and operable to a second limit position when said selected carrier is positioned at said access opening wherein the media is readily removable from said carrier, and
(f) actuating means in said housing adjacent said access opening operable upon arrival of said selected carrier in said access opening to effect actuation of said retaining means on said selected carrier to said second limit position.

8. In a file unit of the type described,
(a) a housing having an access opening provided in one side thereof,
(b) a conveyor in said housing movable in an endless loop of travel,
(c) a plurality of carriers connected to said conveyor,
(d) a plurality of card trays disposed on said carriers,
(e) means for controlling operation of said conveyor to move said carriers to and past said access opening to selectively position a selected carrier in said access opening,
(f) retractable card tray retaining means on said carriers for obstructing movement of said card trays on said carrier under conditions where said carriers are positioned away from said access opening and operable to a releasing condition on a selected carrier positioned in said access opening wherein said card trays are readily removable from said carrier, and
(g) actuating means mounted on said housing adjacent said access opening actuatable upon positioning of the selected carrier in said access opening to effect actuation of said card tray retaining means of the selected carrier to said media releasing condition.

9. The file unit of claim 8 wherein said retractable card tray retaining means includes a longitudinally extending strip member movably mounted on said selected carrier, said strip member being movable to spaced limit positions thereon, and means for maintaining said strip members in one of said limit positions when said carriers are positioned away from said access opening, said strip member on said selected carrier being movable to the other of said spaced limit positions by said actuating means upon said positioning of said selected carrier in said access opening.

10. In a file unit of the class described,
(a) a housing having an access opening provided in one side thereof adjacent a work station,
(b) a conveyor in said housing movable in an endless loop of travel,
(c) a plurality of carriers connected to said conveyor and each carrier having a shelf portion,
(d) a plurality of card trays disposed in side-by-side relationship on the shelf portion of each of said carriers,
(e) means for controlling operation of said conveyor to move said carriers to and past said access opening to position a selected carrier in said access opening adjacent the work station,
(f) a flange provided on the shelf portion of each carrier,
(g) a card tray retaining member mounted on said flange for slidable movement between upper and lower limit positions thereon,
(h) means interconnecting said retaining strip member with said carrier for maintaining said retaining strip member at the upper limit position on said flange adjacent the card trays under conditions where said carriers are positioned away from said work station to obstruct movement of said card trays on said carrier, and
(i) actuating means mounted on said housing adjacent said access opening operable upon positioning of said selected carrier at said work station to engage and drive the retaining strip member of said selected carrier to the lower limit position on said flange portion away from the card trays wherein said trays are readily removable from said carrier at said work station.

11. In a file unit of the class described,
(a) a housing having an access opening provided in one side thereof adjacent a work station,
(b) a conveyor in said housing,
(c) a plurality of carriers connected to said conveyor and having shelf portions for transporting card trays thereon to said work station,
(d) circuit control means including start and stop means for controlling operation of said conveyor to move said conveyor to position a selected carrier in said access opening adjacent said work station,
(e) a card tray retaining member mounted on said selected carrier and selectively operable to spaced limit positions thereon,
(f) said card tray retaining member disposed in one of said limit positions adjacent said card trays to obstruct movement of said card trays on the carrier under conditions where said carrier is positioned away from said work station,
(g) first plunger means being actuatable in response to said control means when the latter is operated for stopping said conveyor and said selected carrier at the work station to move said card tray retaining member to the other of said limit positions under which conditions said card trays are readily removable from said carrier, and
(h) second plunger means operable by said card tray retaining member in said other limit position to open said circuit control means.

12. The file unit of claim 11 wherein said second plunger means include,
(a) a support member,
(b) switch means mounted on said support member in circuit with said circuit control means,
(c) a plate member slidably mounted on said support member and having a first portion for actuating said switch means, and
(d) said plate member having a second portion extending into said access opening in alignment with and engageable by said card tray retaining member in said other limit position and under which conditions said first portion is moved to open said switch means to said circuit control means.

13. The file unit of claim 12 wherein said first plunger means is mounted in said housing at one side of said access opening and said second plunger means is mounted in said housing at the opposite side of said access opening.

14. In combination,
(a) a conveyor,
(b) motor means for driving said conveyor in an endless loop path of travel,
(c) a work station at a predetermined place along the path of conveyor travel,
(d) a plurality of individual carriers having media stored thereon and connected for movement with said conveyor for transporting said media thereon to said work station,
(e) control means for controlling operation of said motor means and effecting the stopping and starting of said conveyor and said carriers,
(f) media retaining means for each of said carriers being selectively operable to media containing and media releasing conditions, said retaining means in said media containing condition obstructing movement of said media from said carriers and in said media releasing condition removing said obstructions whereby said media is readily removable from said carriers,
(g) a plunger motor,
(h) a plunger member positioned with respect to said conveyor so as to be in alignment with the retaining means of a carrier positioned at said work station,
(i) linkage means interconnecting said plunger motor to said plunger member,
(j) energizing means operative in response to operation of said control means upon stopping of said conveyor motor means and positioning of one of said carriers at said work station for energizing said plunger motor to drive said linkage means through a predetermined path wherein said plunger member is moved by said linkage means to effect actuation of said retaining means of said one carrier to said media releasing condition, and
(k) said energizing means being further operative in response to operation of said control means prior to restarting of said conveyor motor means to energize said plunger motor to drive said linkage means through a predetermined return path whereby said plunger member is moved by said linkage means to actuate said media retaining means of said one carrier to media containing condition.

15. The combination of claim 14 wherein there is provided an operating circuit for said conveyor motor means and an operating circuit for said plunger motor, said operating circuit for said plunger motor including two normally open parallel circuits, and wherein said energizing means includes, an energizing circuit in said conveyor motor means operating circuit operable in response to operation of said control means upon said stopping of said conveyor motor means and prior to said restarting of said conveyor motor means to close one of said parallel circuits in said plunger motor operating circuits to pulse said plunger motor to drive said linkage means, switch means for closing the other of said parallel circuits for said plunger motor upon said pulsing of said plunger motor, timing means for maintaining said energizing circuit energized for a predetermined period of time sufficient for said switch means to close said other parallel plunger motor circuit, and cam means associated with said linkage means for controlling operation of said switch means and operable to close said switch means upon pulsing of said plunger motor and further operable to open said switch means and stop said plunger motor upon actuation of said retaining means to said media containing and to said media releasing conditions.

16. The combination of claim 15 wherein said energizing circuit includes an electromagnetic relay having normally open contacts in said first alternate plunger motor circuit, means for energizing said electromagnetic relay in response to said control means upon said stopping and prior to said restarting of said conveyor motor means to close said contacts and pulse said plunger motor, and wherein said timing means include an RC timing circuit in circuit with said electromagnetic relay for delay in deenergizing said relay for said predetermined period of time sufficient to effect said pulsing of said plunger motor.

17. In combination,
(a) a conveyor movable in a predetermined path,
(b) at least one work station disposed along said path,
(c) a plurality of carriers connected for movement with said conveyor and having media provided thereon,
(d) control means being operable for controlling the operation of said conveyor and effecting the starting of said conveyor and the stopping of said conveyor to position a selected carrier at said work station,
(e) retaining means on said carriers operable to a first condition to obstruct movement of said media from said carriers and operable to a second condition wherein the media is readily removable from said carriers,
(f) first means for effecting operation of said retaining means to either of said two conditions, and
(g) second means operable in response to operation of said control means under conditions when said control means operates to stop said conveyor and said selected carrier at said work station to cause said first means to operate said retaining means on said selected carrier to said second condition.

18. In combination,
(a) a conveyor movable in a predetermined path,
(b) at least one work station disposed along said path,
(c) a plurality of carriers connected for movement with said conveyor and having media provided thereon,
(d) control means being operable for controlling the operation of said conveyor and effecting the starting of said conveyor and stopping of said conveyor to position a selected carrier at said work station, and
(e) retaining means on said carriers operable to a first condition wherein movement of said media on said carrier is obstructed and to a second condition wherein the media is readily removable from said carriers,
(f) first means for effecting operation of said retaining means to either of said two conditions, and
(g) second means operable in response to operation of said control means under conditions when said control means operates to start said conveyor to cause said first means to operate said retaining means on a selected carrier positioned at said work station to said first condition prior to movement of said conveyor.

19. In combination,
(a) a conveyor movable in a predetermined path,
(b) at least one work station disposed along said path,
(c) a plurality of carriers connected for movement with said conveyor and for carrying media thereon,
(d) circuit control means being operable to control the movement of said conveyor and effecting the starting of said conveyor and the stopping of said conveyor to position a selected carrier at said work station,
(e) switch means operable for actuation to first and second conditions to respectively establish and interrupt the operation of the circuit control means,
(f) retaining means on said carriers movable to a first position to obstruct movement of said media from said carriers and movable to a second position wherein the media is readily removable from said carriers,
(g) said retaining means in said second positions effecting operation of said switch means from said first condition to said second condition to interrupt operation of said circuit control means, and
(h) actuating means operably connected to said retaining means for moving the retaining means of the selected carrier positioned at said work station to said second position to effect operation of said switch means to said second condition whereby movement of said conveyor is prevented in the second position of said retaining means.

References Cited by the Examiner

UNITED STATES PATENTS

| 1,978,205 | 10/1934 | Ide | 198—158 X |
| 2,575,278 | 11/1951 | Kearney | 198—158 |
| 2,663,446 | 12/1953 | Romain | 214—16.12 |
| 2,719,636 | 10/1955 | Berg | 214—63 |
| 2,773,609 | 12/1956 | Holappa | 214—16.12 |
| 3,105,727 | 10/1963 | Anders | 312—268 X |

FRANK B. SHERRY, *Primary Examiner.*

CHANCELLOR E. HARRIS, *Examiner.*